(12) United States Patent
Boileau et al.

(10) Patent No.: US 10,190,538 B2
(45) Date of Patent: Jan. 29, 2019

(54) THRUST REVERSER DEVICE

(71) Applicant: AIRCELLE, Gonfreville l'Orcher (FR)

(72) Inventors: Patrick Boileau, Tournefeuille (FR); Peter Segat, Courbevoie (FR); Pierre Caruel, Le Havre (FR); Sarah Tissot, Bois d'Arcy (FR)

(73) Assignee: AIRCELLE, Gonfreville l'Orcher (FR)

( * ) Notice: Subject to any disclaimer, the term of this patent is extended or adjusted under 35 U.S.C. 154(b) by 519 days.

(21) Appl. No.: 14/841,407

(22) Filed: Aug. 31, 2015

(65) Prior Publication Data

US 2016/0025039 A1    Jan. 28, 2016

Related U.S. Application Data

(63) Continuation of application No. PCT/FR2014/050460, filed on Mar. 3, 2014.

(30) Foreign Application Priority Data

Mar. 1, 2013   (FR) .................................. 1 3/51 833

(51) Int. Cl.
  *F02K 1/72*   (2006.01)
  *F02K 1/09*   (2006.01)
  *F02K 1/82*   (2006.01)

(52) U.S. Cl.
  CPC .................. *F02K 1/72* (2013.01); *F02K 1/09* (2013.01); *F02K 1/827* (2013.01); *F05D 2240/129* (2013.01); *F05D 2240/90* (2013.01); *F05D 2250/34* (2013.01)

(58) Field of Classification Search
  CPC ... F02K 1/625; F02K 1/62; F02K 1/70; F02K 1/72; F02K 1/80; F02K 1/827; F05D 2240/129; F05D 2240/90; B64D 2027/262; B64D 2027/264; B64D 2027/266
  See application file for complete search history.

(56) References Cited

U.S. PATENT DOCUMENTS

| | | | |
|---|---|---|---|
| 3,503,211 A | 3/1970 | Medawar et al. | |
| 4,442,987 A * | 4/1984 | Legrand | B64D 29/08 239/265.25 |

(Continued)

FOREIGN PATENT DOCUMENTS

| | | |
|---|---|---|
| EP | 0 315 524 A1 | 5/1989 |
| EP | 1 457 659 A2 | 9/2004 |

(Continued)

OTHER PUBLICATIONS

International Search Report dated Nov. 6, 2014 in International Application No. PCT/FR2014/050460.

*Primary Examiner* — Andrew H Nguyen
(74) *Attorney, Agent, or Firm* — Burris Law, PLLC

(57) ABSTRACT

A thrust reverser device for an aircraft turbojet engine includes: a movable cowl, translating cascades connected to the movable cowl, a mast; and a front suspension to suspend the turbojet engine. The cascades translates between a direct jet position where the cascades are retracted in a fan casing, and an indirect jet position where the cascades are brought out of the fan casing. In particular, the cascades have a sliding connection with the mast by means of at least one spacer connected to the mast downstream of the front suspension.

12 Claims, 3 Drawing Sheets

(56) References Cited

U.S. PATENT DOCUMENTS

| | | | | | |
|---|---|---|---|---|---|
| 4,922,713 | A | * | 5/1990 | Barbarin | F02K 1/09 239/265.31 |
| 2004/0245383 | A1 | * | 12/2004 | Udall | B64D 27/16 244/54 |
| 2006/0145001 | A1 | * | 7/2006 | Smith | B64D 29/06 244/110 B |
| 2009/0151320 | A1 | * | 6/2009 | Sternberger | F02K 1/72 60/226.2 |

FOREIGN PATENT DOCUMENTS

| | | |
|---|---|---|
| FR | 2 132 380 A1 | 11/1972 |
| WO | 2012/010774 A2 | 1/2012 |

\* cited by examiner

THRUST REVERSER DEVICE

CROSS-REFERENCE TO RELATED APPLICATIONS

This application is a continuation of International Application No. PCT/FR2014/050460, filed on Mar. 3, 2014, which claims the benefit of FR 13/51833, filed on Mar. 1, 2013. The disclosures of the above applications are incorporated herein by reference.

FIELD

The present disclosure relates to the field of nacelles for turbojet engine, and more specifically, it concerns a thrust reverser device.

BACKGROUND

The statements in this section merely provide background information related to the present disclosure and may not constitute prior art.

An aircraft is propelled by one or several propulsion unit(s) comprising a turbojet engine housed in a tubular nacelle. Each propulsion unit is fastened to the aircraft by a mast generally located under a wing or at the fuselage.

A nacelle generally presents a structure comprising an upstream air inlet section, upstream of the engine, a mid-section intended to surround a fan of the turbojet engine, and a downstream section intended to surround the combustion chamber of the turbojet engine and accommodating a thrust reverser device.

Conventionally, the thrust reverser device may comprise a cowl movable in translation along the axis of the nacelle, this translation being most often carried out thanks to a sliding connection realized between the movable cowl and the mast for fastening a propulsion unit to the aircraft.

Conventionally, the thrust reverser device may implement translating cascades which are retracted on the fan casing (or carter fan) in the direct jet position and which, when switching to the thrust reversal position, slide downstream of the nacelle in concert with the movable cowl of the thrust reverser (or transcowl) so as to be deployed and reach their thrust reversal position.

In this device, the translating cascades have a sliding connection with the fan casing, but they are also connected to the movable cowl of the thrust reverser which leads them towards their thrust reversal position.

In this type of device, there may be a suspension area between the mast and the fan casing, located upstream of the mast. The translating cascades cannot be fixed in this front suspension area because of interferences.

When the turbojet engine is in operation, there are relative displacements between the fan casing and the movable cowl of the thrust reverser which induce undesirable forces on the sliding connection between the fan casing and the translating cascades.

Not only these undesirable forces weaken the whole device, but they also cause misalignments of the translating cascades at their sliding connection with the front casing, thereby impacting the reliability of such a device.

SUMMARY

The present disclosure provides a thrust reverser device for an aircraft turbojet engine comprising:
a movable cowl,
translating cascades connected to the movable cowl, displaceable between, on the one hand a direct jet position wherein they are retracted in a fan casing, and on the other hand an indirect jet position wherein they are brought out of said fan casing,
a mast,
a front means for suspending said turbojet engine,
remarkable in that the translating cascades have a sliding connection with the mast by means of at least one spacer connected to the mast downstream of the front suspension.

According to other features of the present disclosure, the thrust reverser device includes one or more of the following optional features, considered alone or according to all possible combinations:
the spacer is removably fixed on the mast;
the spacer comprises fixed cascades;
the translating cascades comprise a rear frame (17) downstream of which is embedded a thrust reverser flaps shroud (18) whose dimensions, with respect to a main axis of the thrust reverser device, are enlarged up to the downstream end of the thrust reverser flaps, the flaps shroud allows extending the distance of guiding the translating cascades on the spacer;
the assembly (20) formed by the rear frame and the flaps shroud has a sliding connection with the mast;
the assembly formed by the rear frame and the flaps shroud has a sliding connection directly with the mast;
a second spacer is located between the mast and the translating cascades and, on the one hand fixed on a lateral frame of the translating cascades on which they bear, and on the other hand connected to a connecting member connected to the mast;
the second spacer is located between the first spacer and the axis of the thrust reverser device;
the second spacer presents a bead, extending radially outward from the thrust reverser device, substantially rectilinear, parallel to the axis of the thrust reverser device, and located on the edge of the second spacer which is the closest to the mast;
the second spacer has a sliding connection with the connecting member by means of the groove and the bead;
the bead presents a substantially half-moon shaped contour and the groove presents a contour with a substantially complementary shape;
the connecting member is fixed relative to the mast to which it is integrated or brought;
the connecting member has a sliding connection relative to the mast;
the connecting member has a sliding connection relative to the mast by means of a primary rail for guiding in translation the movable cowl of the thrust reverser;
the connecting member is integrated to the edge of the movable cowl of the thrust reverser;
the movable cowl has a sliding connection with the mast by means of a beam (21) on which the movable cowl is articulated so that the movable cowl slides along the axis of the thrust reverser device, thus, the assembly formed by the translating cascades and the movable cowl is secured to the mast, thereby allowing a guidance and an optimum take-up of force toward the latter;
the beam has a sliding connection with the primary rail and a secondary rail (14');
the secondary rail is located radially between an outer wall of the movable cowl and the fixed cascades;

a primary glider in sliding connection with the primary rail presents a cut-out substantially located at the downstream end of the fixed cascades;

the portion of the primary glider upstream of the cut-out supports the rear frame and the flaps shroud and the portion of the primary glider downstream of the cut-out supports the beam, so as to enable a rotation of the assembly formed by the rear frame and the flaps shroud about the mast and thereby prevent the passage of parasitic bending moments between the mast and the frame assembly formed by the rear frame and the flaps shroud;

the movable cowl is articulated on the beam by hinges;

discrete means for taking up the axial and radial forces are disposed on the downstream end of the flaps shroud and the upstream end of an inner wall of the movable cowl;

the discrete take-up means consist of knives-splines sectors;

the beam comprises stiffeners;

the beam presents a recess so that, once mounted, the beam and the fixed cascades are interleaved;

the beam is connected directly with the second spacer;

the beam is embedded directly on the second spacer;

the translating cascades, the rear frame and the flaps shroud are connected to the beam;

the translating cascades, the rear frame and the flaps shroud are embedded on the beam on the side of their edges located facing the mast, thus the beam, the translating cascades, the flaps shroud form a monolithic assembly in a sliding connection with the mast;

the translating cascades, the rear frame and the flaps shroud are embedded on the beam on the side of their edges located facing the mast, thus the beam, the translating cascades, the flaps shroud and the second spacer form a monolithic assembly in sliding connection with the mast;

the rear frame presents a recess intended for the passage of the fixed cascades during the translation of the movable assembly;

the movable cowl can rotate about the beam so as to allow the movable cowl to switch to the maintenance position;

the inner wall of the movable cowl comprises a recessed portion (22) so as to enable the movable cowl to rotate about the mast by means of the beam for the engine maintenance operations without being prevented by the fixed cascades;

an acoustic panel (23) capable of cooperating with the recessed portion of the inner wall of the movable cowl is fixed on the flaps shroud and located below the fixed cascades so that the acoustic panel does not pivot with the rest of the movable cowl when the latter is open in a maintenance position;

the acoustic panel fixed to the flaps shroud is also fixed on a glider of translation, in a sliding connection with the fixed cascades, of the translating cascades, so as to preserve therewith a pathway of force in the deployed position;

the acoustic panel presents a 45° angle between its downstream edge and its edge which is the furthest away from the mast in order to optimize the transmission of the forces toward the hinges of the beam, the inner wall of the movable cowl being recessed so that the inner wall of the movable cowl and the acoustic panel present a complementary shape;

the rear frame and the flaps shroud are softened, in particular so as to not transmit parasitic bending moment between the mast and the assembly formed by the rear frame and the flaps shroud;

an area to be softened is the area of the flaps shroud located below the fixed cascades when the movable cowl is in the direct jet position;

The present disclosure also concerns a nacelle comprising such a thrust reverser device.

This solution avoids guidance of the translating cascades on the fan casing. Thus, all the forces of the engine pass to the mast via the front suspension means. Otherwise, the cascades would act as a suspension which may exceed their structural capacity.

The present disclosure also concerns a method for respectively detaching (attaching) an engine of an aircraft from (to) the mast comprising a step of dismounting (mounting) the fixed cascades from (to) the mast and a step of dismounting (mounting) the suspensions that connect the engine to the mast.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
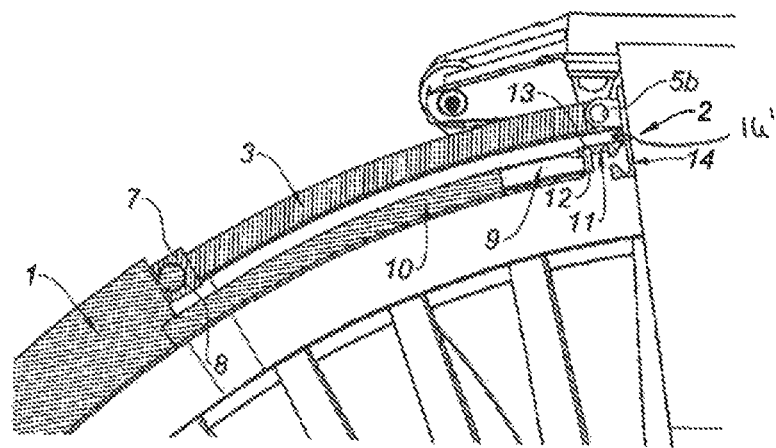
FIG. 3 is a partial sectional view of the thrust reverser device according to the present disclosure, taken along the direction (III) defined in FIG. 2.
Figure 4:
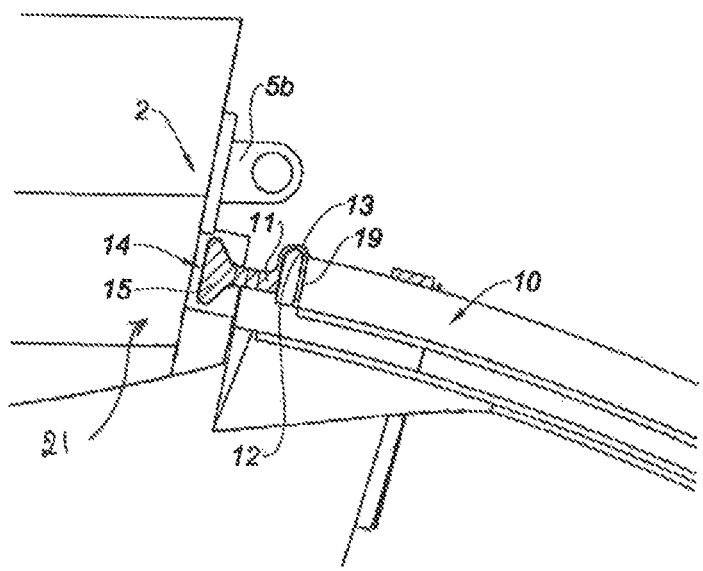
Figure 5:
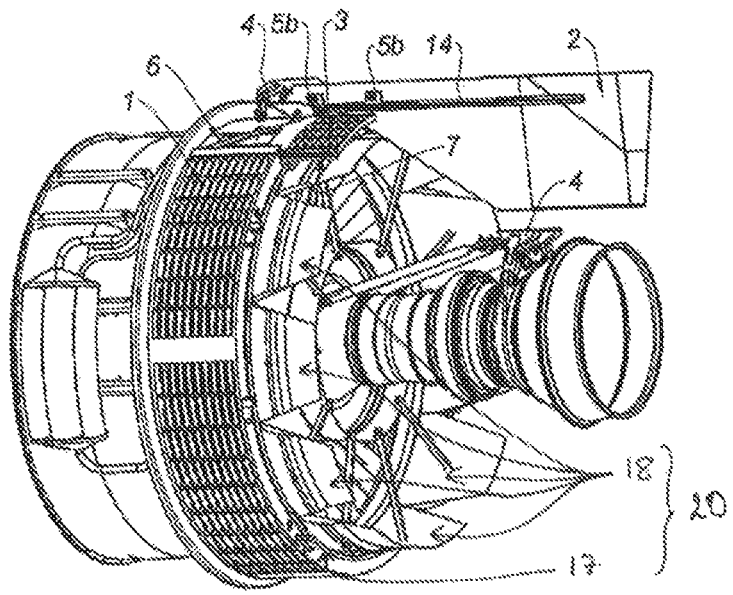
Figure 6:
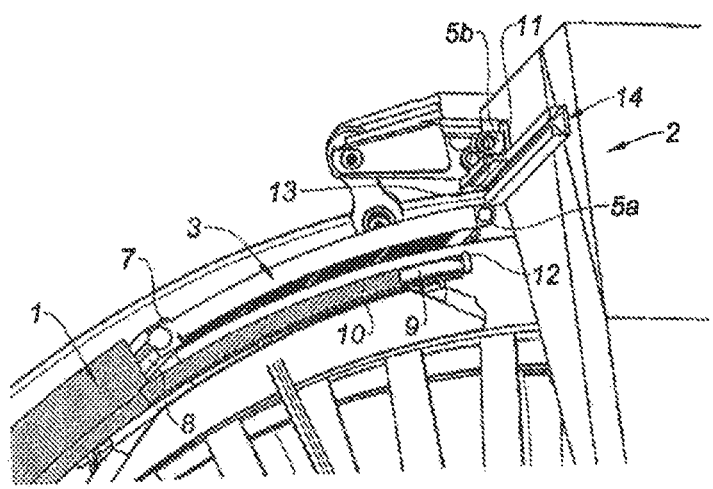

FIG. 4 a partial sectional view of the thrust reverser device according to another form of the present disclosure, taken in a similar way as FIG. 3;

FIG. 5 is a perspective view of the device in an intermediate dismounting/mounting phase; and FIG. 6 is a partial schematic view of the device in an intermediate dismounting/mounting phase, taken along the direction (VI) of FIG. 5.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
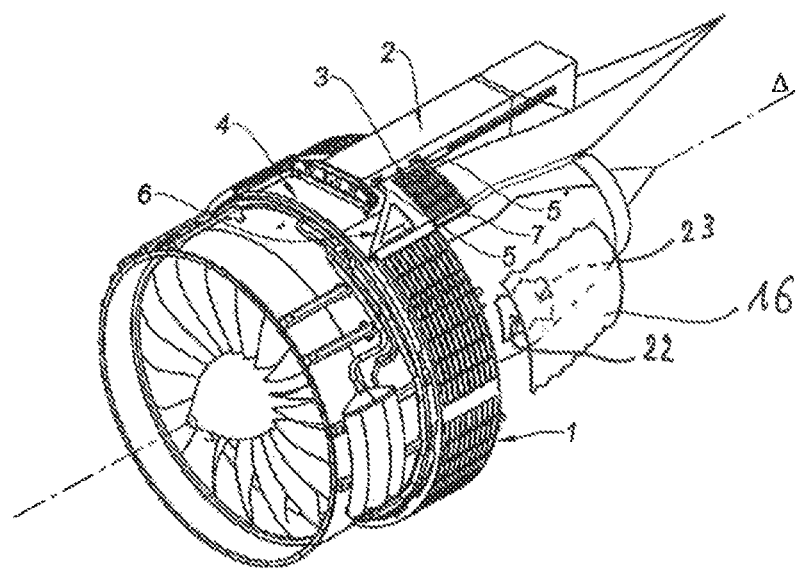
FIG. 1 is a perspective view of a thrust reverser device according to one form of the present disclosure, the outer cowls having been removed.

Referring to FIG. 1, there is described a thrust reverser device for an aircraft turbojet engine comprising:

a movable cowl 16, translating cascades 1 connected to the movable cowl and displaceable between, on the one hand a direct jet position wherein they are retracted in a fan casing, and on the other hand an indirect jet position wherein they are brought out of said fan casing, a mast 2, a front means 4 for suspending said turbojet engine, the translating cascades 1 have a sliding connection with the mast 2 by means of fixed cascades 3 connected to the mast 2 downstream of the front suspension 4.

The front suspension 4 is the upstream suspension of the engine or turbojet engine of the aircraft.

An aircraft may comprise two suspension means for a turbojet engine, one front and one rear.

By upstream, we mean what lies before the considered point or element, in the direction of the flowing of air in a turbojet engine, and by downstream, we mean what lies after the considered point or element, in the direction of the flowing of air in a turbojet engine.

The fixed cascades 3 are removably mounted on the mast 2 by means of a set 5 of fittings 5a and 5b, the fittings 5b being integrated to the mast 2, the fittings 5a being integrated to the edge of the fixed cascades 3 which is the closest to the mast 2 when they are positioned relative to the mast 2 in a way adapted for the thrust reversal.

In one form, the fixed cascades 3 form a rectangle and are extended on the upstream edge of the rectangle by a bracket 6, the bracket 6 and the rectangle presenting a common edge and being manufactured in one-piece; orthogonal to this common edge there is another edge of the bracket 6 which lies in the continuity of the edge of the rectangle which is the furthest away from the mast 2. For simplicity, these two latter edges will be called the edge 7.

In the direct jet position, that is to say when the thrust reverser device is not operational, the translating cascades are located substantially in the fan casing (also called "carter fan").

Figure 2:
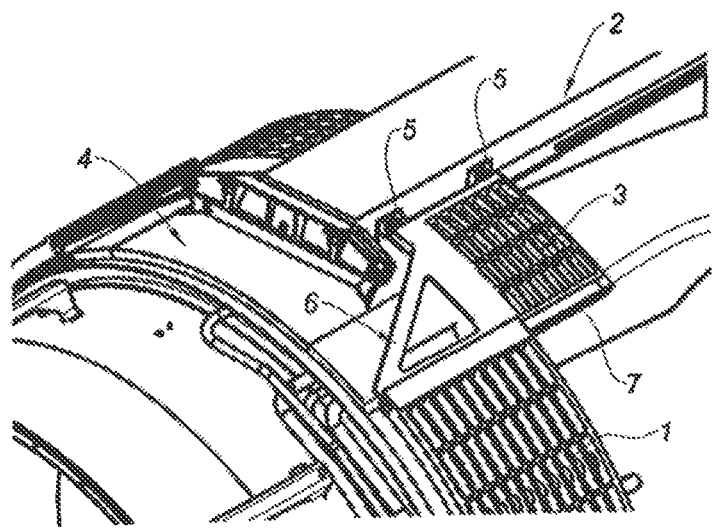
FIG. 2 is a perspective view of the area (II) defined in FIG. 1 of the thrust reverser device according to the present disclosure.

Referring to FIG. 2, there is described the connection between the translating cascades 1 and the fixed cascades 3: the translating cascades 1 and the fixed cascades 3 have a sliding connection. To this end, the edge 7 presents a rail 8 (FIG. 3) shaped so as to allow maintaining the translating cascades 1 in a sliding connection. In the direct jet position, the translating cascades 1 are located substantially upstream of the fixed cascades 3 on the portion of the edge 7 that forms a side of the bracket 6, whereas in the thrust reversal position, they are located substantially in the extension of the vanes of the fixed cascades 3.

Referring to FIG. 3, there is described a spacer 9 located between the mast 2 and the translating cascades 1 and, on the one hand fixed on a lateral frame 10 of the translating cascades 1 on which they bear, and on the other hand connected to a connecting member 11 connected to the mast 2.

The spacer 9 is located between the fixed cascades 3 and the axis Δ(FIG. 1) of the thrust reverser device.

The spacer 9 presents a bead 12, extending radially outward from the thrust reverser device, substantially rectilinear, parallel to the axis Δ of the thrust reverser device, and located on the edge of the spacer 9 which is the closest to the mast 2.

The spacer 9 has a sliding connection with the connecting member 11 by means of a groove 13 of the connecting member 11, and the bead 12.

The bead 12 presents a substantially half-moon shaped contour and the groove 13 presents a contour with a substantially complementary shape.

The connecting member 11 is fixed relative to the mast 2 and it is integrated to the mast 2, but it could also have been brought on the mast 2. In one form, the connecting member 11 lies in the continuity of a primary rail 14, to which it is integrated, for guiding in translation the thrust reverser movable cowl (or transcowl), the primary rail 14 being integrated to the mast 2.

Referring to FIG. 4, there is described another form of the connecting member 11. In this form, the connecting member 11 is integrated to the edge 15 of the movable cowl that is to be inserted in the primary rail 14. In this form, the connecting member 11 has therefore a sliding connection relative to the mast 2.

In operation, when the thrust reverser device is actuated so as to be deployed to its reverse jet position (in the thrust reversal mode), the movable cowl translates from a retracted position to a deployed position downstream of the mast 2 and along this mast 2 thanks to the primary rail 14 wherein its edge 15 is inserted.

Since the movable cowl is connected with the translating cascades 1, it pulls the translating cascades 1 at least on part of its travel in order to bring them in their downstream deployed reverse jet position. The translating cascades 1 then translate downstream of the mast 2 and along this mast 2 thanks to the rail of the edge 7 of the fixed cascades 3.

In parallel, the spacer 9 translates along the connecting groove 13. The spacer 9 serves not only to optimize the guidance in translation of the translating cascades 1, but also to take up the radial forces that are induced in the translating cascades 1.

The reverse operation takes place during retraction of the translating cascades 1 in the fan casing in the direct jet position, that is to say in the cruise position.

According to another form of the present disclosure where the connecting member 11 is integrated to the edge 15 of the movable cowl, the modus operandi is the same as described before, except that the connecting member 11 translates in concert with the movable cowl.

The present disclosure also concerns a nacelle (not represented) including a thrust reverser device as described above.

Referring to FIGS. 5 and 6, there is described a method for detaching (respectively attaching) an aircraft engine from (respectively to) the mast 2 comprising a step of dismounting (respectively mounting) the fixed cascades 3 from (respectively to) the mast 2 and a step of dismounting (respectively mounting) the suspensions 4 that connect the engine to the mast 2.

The device such as described above is particularly visible in the dismounted position in FIG. 6 where the connection between the fixed cascades 3 and the mast 2 has been dismounted and where the spacer 9 is disengaged from the connecting member 11.

It goes without saying that the present disclosure is not limited to the form described above as an example, but it encompasses all technical equivalents and all variants of the described means as well as their possible combinations.

What is claimed is:

1. A thrust reverser device for a turbojet engine of an aircraft comprising:
   a movable cowl;
   translating cascades connected to the movable cowl and displaceable between a direct jet position where the translating cascades are retracted in a fan casing, and an indirect jet position where the translating cascades are brought out of the fan casing;
   a mast configured to connect the turbojet engine to the aircraft; and
   a front suspension configured to suspend the turbojet engine from the mast, wherein the translating cascades have a sliding connection with the mast via at least one spacer mounted to a sidewall of the mast downstream of the front suspension, wherein said at least one spacer comprises fixed cascades.

2. The thrust reverser device according to claim 1, wherein said at least one spacer is removably fixed on the mast.

3. The thrust reverser device according to claim 1, wherein the at least one spacer includes a second spacer located between the mast and the translating cascades, the second spacer being fixed on a lateral frame of the translating cascades on which the translating cascades bear, and connected to a connecting member connected to the mast.

4. The thrust reverser device according to claim 3, wherein the second spacer is located between the fixed cascades and an axis (A) of the thrust reverser device.

5. The thrust reverser device according to claim 3, wherein the second spacer presents a bead, extending substantially rectilinear, parallel to an axis (A) of the thrust reverser device, and located on an edge of the second spacer which is the closest to the mast.

6. The thrust reverser device according to claim 5, wherein the second spacer has a sliding connection with the connecting member via a groove of the connecting member and the bead.

7. The thrust reverser device according to claim 6, wherein the bead presents a substantially half-moon shaped contour and the groove presents a contour with a substantially complementary shape.

8. The thrust reverser device according to claim 3, wherein the connecting member is fixed relative to the mast to which the connecting member is integrated or mounted.

9. The thrust reverser device according to claim 3, wherein the connecting member has a sliding connection relative to the mast.

10. The thrust reverser device according to claim 9, wherein the connecting member has the sliding connection relative to the mast via a primary rail configured to guide in translation the movable cowl of the thrust reverser.

11. The thrust reverser device according to claim 10, wherein the connecting member is integrated to an edge of the movable cowl of the thrust reverser.

12. A nacelle comprising the thrust reverser device according to claim 1.

* * * * *